(12) United States Patent
Juretzek

(10) Patent No.: US 11,008,897 B2
(45) Date of Patent: May 18, 2021

(54) CONDENSATE RECIRCULATION

(71) Applicant: Siemens Aktiengesellschaft, Munich (DE)

(72) Inventor: Uwe Juretzek, Erlangen (DE)

(73) Assignee: Siemens Energy Global GmbH & Co. KG, Munich (DE)

(*) Notice: Subject to any disclaimer, the term of this patent is extended or adjusted under 35 U.S.C. 154(b) by 51 days.

(21) Appl. No.: 15/781,716

(22) PCT Filed: Mar. 31, 2017

(86) PCT No.: PCT/EP2017/057727
§ 371 (c)(1),
(2) Date: Jun. 6, 2018

(87) PCT Pub. No.: WO2017/215804
PCT Pub. Date: Dec. 21, 2017

(65) Prior Publication Data
US 2019/0093518 A1    Mar. 28, 2019

(30) Foreign Application Priority Data
Jun. 17, 2016   (DE) .......................... 102016210894.8

(51) Int. Cl.
*F02C 7/224*      (2006.01)
*F01K 17/02*      (2006.01)
(Continued)

(52) U.S. Cl.
CPC ............ *F01K 17/025* (2013.01); *F01K 19/10* (2013.01); *F02C 6/18* (2013.01); *F02C 7/224* (2013.01);
(Continued)

(58) Field of Classification Search
CPC ...... F01K 23/10; F01K 23/101; F01K 23/106; F01K 23/108; F02C 6/18; Y02E 20/16
See application file for complete search history.

(56) References Cited

U.S. PATENT DOCUMENTS 5,357,746 A    10/1994  Myers et al.
5,992,138 A *  11/1999  Bruckner .............. F01K 23/106
                                                        60/783
(Continued)

FOREIGN PATENT DOCUMENTS

CN    101815903 A    8/2010
DE    19512466 C1    8/1996
(Continued)

OTHER PUBLICATIONS

Wilhelm Ernstberger DE 19512466 English translation (Year: 1996).*
(Continued)

*Primary Examiner* — Steven M Sutherland

(57) ABSTRACT

A combined cycle turbine plant having at least one gas turbine, a steam turbine and at least one waste heat steam generator. The waste heat steam generator has at least one condensate pre-heater into which a condensate line discharges, and has a feed water pre-heater which is connected upstream of the condensate pre-heater in the flow direction of a gas turbine flue gas and upstream of which, on the feed water side, there is connected a feed water pump, and which is connected to a fuel preheating unit for the gas turbine. From the fuel preheating unit a line for cooled feed water discharges into a motive medium inlet of a jet pump of which the suction medium inlet is connected to an outlet of
(Continued)

the condensate pre-heater and of which the outlet is connected to the condensate line. A corresponding method recirculates condensate in a combined cycle turbine plant.

7 Claims, 4 Drawing Sheets

(51) Int. Cl.
  *F01K 19/10* (2006.01)
  *F02C 6/18* (2006.01)

(52) U.S. Cl.
  CPC ...... *F05D 2220/32* (2013.01); *F05D 2220/60* (2013.01); *F05D 2220/72* (2013.01); *F05D 2260/20* (2013.01)

(56) References Cited

U.S. PATENT DOCUMENTS

| | | | |
|---|---|---|---|
| 6,041,588 A | 3/2000 | Brueckner et al. | |
| 6,233,940 B1* | 5/2001 | Uji | F01K 21/047 60/39.01 |
| 6,343,570 B1 | 2/2002 | Schmid et al. | |
| 2010/0187319 A1 | 7/2010 | Isom et al. | |
| 2016/0003159 A1 | 1/2016 | Hotta | |
| 2018/0171830 A1* | 6/2018 | Bucher | F01K 23/065 |
| 2018/0363557 A1* | 12/2018 | Sumimura | F22B 1/18 |

FOREIGN PATENT DOCUMENTS

| | | |
|---|---|---|
| DE | 19736888 A1 | 10/1998 |
| EP | 0931911 A2 | 7/1999 |
| EP | 2138677 A1 | 12/2009 |
| EP | 2426337 A1 | 3/2012 |
| EP | 2626532 A1 | 8/2013 |
| JP | S489841 A | 3/1973 |
| JP | H06241005 A | 8/1994 |
| JP | 2001514368 A | 9/2001 |
| JP | 2002021508 A | 1/2002 |
| JP | 2006037852 A | 2/2006 |
| JP | 2014185613 A | 10/2014 |
| KR | 19990067952 A | 8/1999 |
| KR | 20150105478 A | 9/2015 |
| KR | 101781627 B1 | 9/2017 |
| WO | 2006048505 A1 | 5/2006 |

OTHER PUBLICATIONS

Jan Wilkes EP 2626532 English translation (Year: 2013).*
International Search Report dated Jun. 26, 2017, for PCT/EP2017/057727.

* cited by examiner

CONDENSATE RECIRCULATION

CROSS REFERENCE TO RELATED APPLICATIONS

This application is the US National Stage of International Application No. PCT/EP2017/057727 filed Mar. 31, 2017, and claims the benefit thereof. The International Application claims the benefit of German Application No. DE 102016210894.8 filed Jun. 17, 2016. All of the applications are incorporated by reference herein in their entirety.

FIELD OF INVENTION

The invention relates to a combined-cycle turbine plant with condensate recirculation and to a method for condensate recirculation in a combined-cycle turbine plant.

BACKGROUND OF INVENTION

The fuels used in combined-cycle (CC) turbine plants have more or less elevated sulfur contents, among other things. Together with the water content arising on combustion of gas or oil, there is a risk of sulfuric acid, sulfurous acid, water etc. condensing in the "cold" part of the waste heat steam generator (in particular condensate preheater) if the temperature falls below the corresponding waste gas dew points, leading to corrosion and ultimately to component failure. This problem is particularly pronounced in the case of fuels with high sulfur contents.

To prevent the temperature from falling below the waste gas dew point and the associated accumulation of water/acid (in particular sulfuric acid), the condensate temperature in a combined-cycle turbine plant has to be increased to a corresponding minimum temperature before the condensate enters the condensate preheater of the waste heat steam generator. This is because the heat transfer is determined from the water side, i.e. the waste gas-side pipe wall temperature corresponds roughly to the condensate temperature present internally. The condensate temperature is in turn set by the defined recooling conditions (cooling type, design of cooling system, ambient conditions etc.). The minimum condensate inlet temperature for preventing the temperature from falling below the waste gas dew point has hitherto generally been ensured by recirculating hot water from the condensate preheater outlet to the condensate preheater inlet by means of separate, electrically operated recirculation pumps or corresponding tapping of the feedwater pumps.

Common to these previous solutions is the fact that they entail relatively high expenditure on components (as a result of comparatively large recirculation pumps etc.) and impair the power/efficiency of the power station (due to the inherent electrical requirements of the components used).

This expenditure becomes ever greater, the higher the sulfur content in the fuel. As sulfur contents increase, the loss of power and efficiency in the steam part of the combined-cycle turbine plant becomes ever more significant since, as the sulfur content increases, the heat which can still be used (only the heat above dew point is usable) downstream of the low pressure evaporator is no longer sufficient to preheat the condensate sufficiently and therefore higher value heat from the hotter region of the waste heat steam generator has to be used (for example by backing up at the low pressure evaporator). This higher value heat is thus also no longer available for steam production and the power and efficiency of the combined-cycle turbine plant fall markedly.

If the sulfur contents increase still further, steam tapped from the steam turbine to preheat the condensate or generated in the waste heat steam generator specifically just for condensate preheating has to be used. This steam is no longer available to the steam turbine and the power and efficiency of the combined-cycle turbine plant fall still further.

SUMMARY OF INVENTION

An object of the invention is to provide a combined-cycle turbine plant with improved condensate recirculation. A further object of the invention is to provide a corresponding method for condensate recirculation in a combined-cycle turbine plant.

The invention achieves the object directed at a combined-cycle turbine plant by providing that, in such a plant with at least one gas turbine, a steam turbine and at least one waste heat steam generator, the waste heat steam generator comprising at least one condensate preheater into which a condensate line leads and a feedwater preheater connected upstream of the condensate preheater in the direction of flow of a gas turbine waste gas, upstream of which feedwater preheater a feedwater pump is connected on the feedwater side and which is connected with a fuel preheating unit for the gas turbine, a line for cooled feedwater leads from the fuel preheating unit into a pump medium inlet of a jet pump, the suction medium inlet of which is connected to an outlet of the condensate preheater and the outlet of which is connected to the condensate line.

As a rule, to increase the efficiency of combined-cycle power plants, the gaseous fuel of the gas turbine is preheated up to around 215° C. by means of waste gas heat. To this end, a partial flow, which transfers its heat via a heat exchanger to the fuel gas, is branched off from the outlet of the medium pressure feedwater preheater. This then heavily cooled (for example around 70° C.) medium pressure feedwater partial mass flow is admixed with the condensate to be heated in the waste heat steam generator and throttled in the process from around 60 bar to the pressure level prevailing therein of around 25 bar. To use this previously throttled-away pressure energy, a jet pump has then to be used according to the invention, which uses the medium pressure feedwater partial mass flow as a pump fluid after passage through the fuel preheater and thus draws in condensate from the condensate preheater outlet (temperature for example around 150° C.). The resultant mixed flow is admixed with the condensate flow before entry into the condensate preheater heating surfaces of the waste heat steam generator and thus the temperature of the overall mass flow is raised to the extent necessary to prevent it from falling below dew points.

In one advantageous embodiment, an outlet of the feedwater pump can be connected into the pump medium inlet of the jet pump. If a liquid back-up fuel is also to be used in addition to the gaseous main fuel and the fuel gas preheater cannot therefore by definition be used as a heat sink, alternative measures need namely to be taken to reduce the pump fluid mass flow temperature, since undesired evaporation phenomena could otherwise arise in the jet pump. One possible measure is to use medium pressure feedwater which has not yet been further heated from the outlet of the medium pressure feedwater pump as pump fluid.

In this connection, in one further advantageous embodiment a control valve is provided for changing over between feedwater from the feedwater preheater and water from the feedwater pump or for mixing feedwater from the feedwater preheater and water from the feedwater pump. Mixing of the pump fluid from "hot" and "cold" feedwater would thus also be conceivable.

In one alternative embodiment, a feedwater extraction point is provided between inlet and outlet of the feedwater preheater, which feedwater extraction point may be connected into the pump medium inlet of the jet pump. Feed water may thus be fed to the jet pump at the right temperature, without its being necessary to mix two feedwater flows at different temperatures.

In one further advantageous embodiment, a heat exchanger is connected on the primary side into a line to the pump medium inlet of the jet pump and on the secondary side into the condensate line. This embodiment, in which the temperature of the pump fluid mass flow is recooled in a heat exchanger by condensate from the condenser hotwell, allows comparatively high condensate inlet temperatures, which is advantageous with the generally sulfur-containing liquid fuels.

For particularly high sulfur contents in the fuel (optionally in combination with low condenser pressures) it may be that the condensate recirculation by means of jet pump alone is no longer sufficient to achieve the desired minimum inlet temperature into the condensate preheater of the boiler.

In this case, the jet pump solution can be combined without any difficulty with further measures to increase the condensate inlet temperature (for example use of extraction steam from the steam turbine). It is however precisely if the sulfur-containing fuel is used only as an emergency fuel, and efficiency may in this case be regarded as secondary, that the necessary temperature rise may also be achieved by simple, inexpensive measures (e.g. opening the cold bypass).

The quantity of the outlet mass flow of the jet pump (the recirculation mass flow) may be controlled in different ways and in line with requirements, even if the requirement always remains to provide the quantity of heating medium for the fuel gas preheater independently thereof. In one advantageous embodiment, for example, a bypass line for a pump medium may be guided around the jet pump, wherein a pump fluid mass flow regulator valve is arranged in the bypass line, such that the pump fluid mass flow may be guided via this controlled bypass wholly or in part past the jet pump. Optionally additive control of the suction mass flow or of the mixed flow leaving the jet pump is also conceivable.

Finally, it is advantageous if a further outlet of the feedwater pump with a pressure level raised relative to the outlet (medium pressure feedwater extraction) or an outlet of a further feedwater pump with a pressure level raised relative to the feedwater pump leads into a pump medium inlet of a further jet pump, the suction medium inlet of which is likewise connected with an outlet of the condensate preheater and the outlet of which is likewise connected with the condensate line, such that the two jet pumps recirculate condensate in parallel. In this way, feedwater at different temperatures and pressure stages may be used for preheating fuel gas and also for condensate recirculation and preheating. In the case of oil operation, in which the steam mass flow drops, unused feedwater flow may for example be put to meaningful use.

The object directed at a method is achieved by a method for condensate recirculation in a combined-cycle turbine plant in which, in gas operation, fuel is heated by feedwater heated in the feedwater preheater of a waste heat steam generator, wherein the feedwater cools, characterized in that the cooled feedwater is used as the pump fluid mass flow in a jet pump to draw in condensate from an outlet of a condensate preheater and wherein a mixed flow resulting from feedwater and condensate is admixed with a condensate flow before entry into a condensate preheater arranged in the waste heat steam generator.

In liquid fuel operation of the combined-cycle turbine plant, feedwater before entry into the waste heat steam generator is advantageously used as the pump fluid mass flow in the jet pump.

It is furthermore advantageous if a temperature of the feedwater used as the pump fluid mass flow for the jet pump is controlled by changing over between feedwater before entry into the waste heat steam generator and heated feed water or by mixing these suitably.

It may be convenient if, for operation of the jet pump, feedwater is extracted from the feedwater preheater at a feedwater extraction point which is arranged upstream of an outlet of the feedwater preheater in the direction of flow of the feedwater.

Furthermore, it is advantageous for a temperature of the pump fluid mass flow to be reduced by heat exchange with the condensate flow.

It is likewise advantageous for the pump fluid mass flow to be guided if necessary in a controlled manner wholly or in part past the jet pump via a bypass line.

Finally, it is advantageous for feedwater from different pressure stages to be used as a pump fluid mass flow for jet pumps.

With the invention, a previously unused pressure gradient from the return flow of the heating medium of the fuel preheater may be used by means of a jet pump, the purpose of which is to draw in hot condensate from the outlet of the condensate preheater and to use the resultant overall flow for mixing with the condensate from the condenser hotwell and thus to raise the condensate inlet temperature.

Several advantages are associated with this use. The previous electrically driven recirculation pumps may be dispensed with completely or at least greatly reduced in size, resulting in marked savings in the power station's own requirements. Compared with centrifugal pumps, moreover, jet pumps are very simply constructed and thus inexpensive components which additionally require still fewer supply/auxiliary devices (no drive motor, no foundation etc.), resulting in corresponding marked cost savings. Furthermore, jet pumps do not contain any moving parts, do not themselves require any electrical power etc. and are thus markedly more reliable than centrifugal pumps, rendering corresponding—hitherto conventional—pump-side redundancy unnecessary, resulting once again in a cost saving.

In combined-cycle turbine plants with a plurality of waste heat steam generators, it is advisable to associate a suitably dimensioned jet pump with each waste heat steam generator in the immediate vicinity thereof. This results in economies of pipework and improved adaptability of jet pump operation to the requirements of the respective waste heat steam generator.

BRIEF DESCRIPTION OF THE DRAWINGS

The invention is explained in greater detail by way of example with reference to the drawings, in which, schematically and not to scale.

DETAILED DESCRIPTION OF INVENTION

Figure 1:
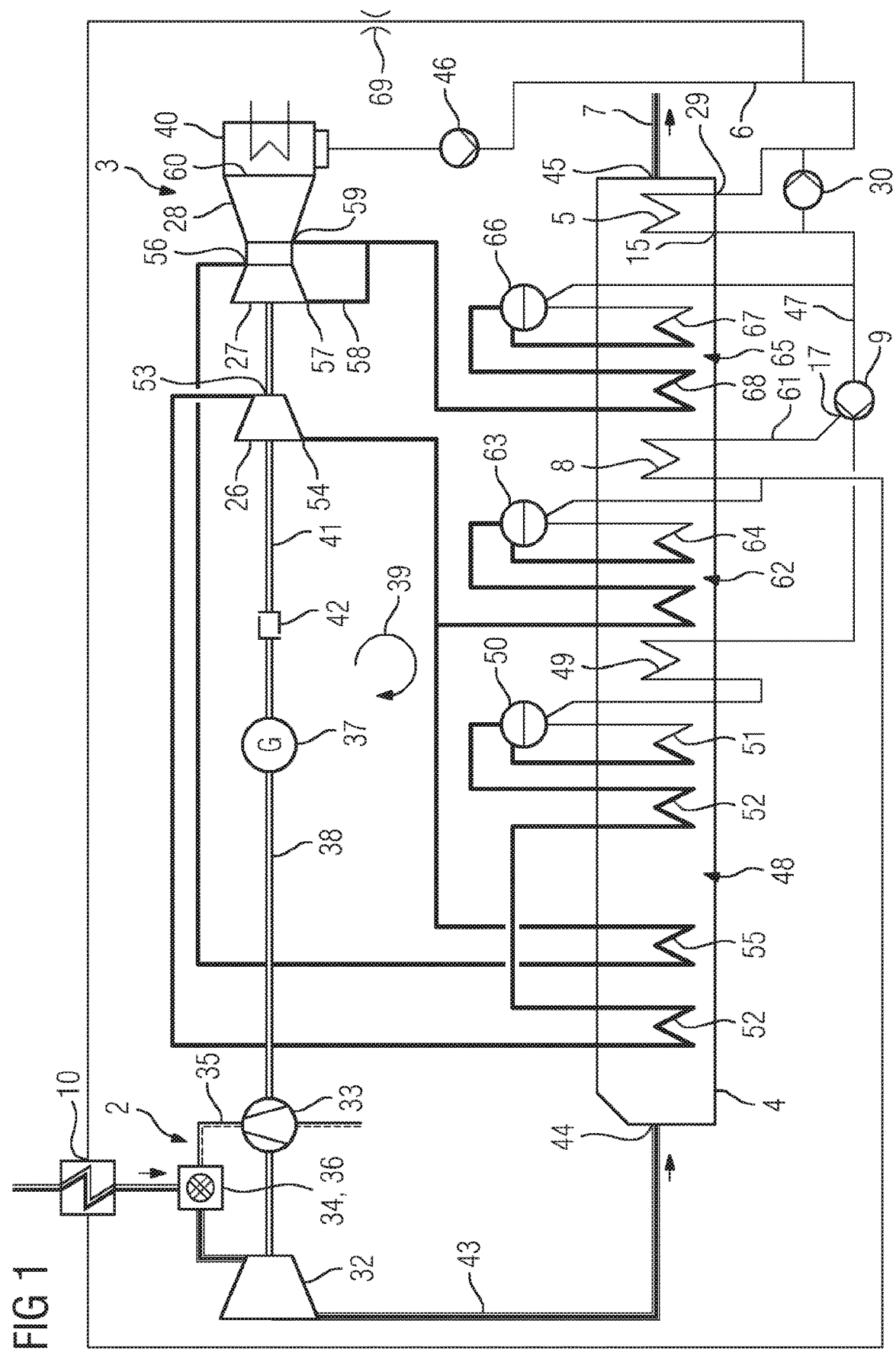
FIG. 1 shows a combined-cycle turbine plant with condensate recirculation according to the prior art.

The combined-cycle turbine plant according to FIG. 1 comprises a gas turbine 2 and a steam turbine 3. The gas turbine 2 comprises a turbine 32 with connected air compressor 33 and a combustion chamber 34 connected upstream of the turbine 32, which combustion chamber is connected to a compressed air line 35 of the compressor 33. The combustion chamber 34 comprises at least one burner 36. The turbine 32 and the air compressor 33 and a generator 37 are arranged on a common shaft 38.

A condenser 40 is connected downstream of the steam turbine 3 in a water-steam circuit 39. In addition, the water-steam circuit 39 comprises a waste heat steam generator 4. The steam turbine 3 consists of a first pressure stage 26 or a high pressure part and a second pressure stage 27 or a medium pressure part. Furthermore, a third pressure stage 28 or a low pressure part of the steam turbine 3 is provided, wherein the pressure stages 26, 27, 28 drive the generator 37 via a common shaft 41 with a coupling 42.

To supply working medium or flue gas expanded in the gas turbine 2 to the waste heat steam generator 4, a waste gas line 43 is connected to an inlet 44 of the waste heat steam generator 4. The expanded working medium from the gas turbine 2, i.e. the gas turbine waste gas 7, leaves the waste heat steam generator 4 via the outlet 45 thereof in the direction of a chimney, not described in any greater detail.

The waste heat steam generator 4 comprises a condensate preheater 5, which may be fed on the inlet side via a condensate line 6, into which a condensate pump unit 46 is connected, with condensate from the condenser 40. The condensate preheater 5 is connected on the outlet side via a line 47 to a high pressure feed pump 9 with medium pressure tap 17.

The high pressure feed pump 9 brings the feed water to a pressure level suitable for a high pressure stage 48 in the water-steam circuit 39 associated with the high pressure part 26 of the steam turbine 3. The highly pressurized feedwater may be fed to the high pressure stage 48 via a feedwater preheater 49, which is connected on the outlet side to a high pressure drum 50. The high pressure drum 50 is connected with a high pressure evaporator 51 arranged in the waste heat steam generator 4 to form a water-steam cycle. To carry away live steam, the high pressure drum 50 is connected to a high pressure superheater 52 arranged in the waste heat steam generator 4 and connected on the outlet side with the steam inlet 53 of the high pressure part 26 of the steam turbine 3.

The steam outlet 54 of the high pressure part 26 of the steam turbine 3 is connected via an intermediate superheater 55 to the steam inlet 56 of the medium pressure part 27 of the steam turbine 3. The steam outlet 57 thereof is connected via an overflow line 58 to the steam inlet 59 of the low pressure part 28 of the steam turbine 3. The steam outlet 60 of the low pressure part 28 of the steam turbine 3 is connected to the condenser 40, so resulting in a closed water-steam circuit 39.

A branch line 61 additionally branches off from the high pressure feed pump 9 at an outlet 17, at which the condensate has reached a medium pressure (for which reason the outlet 17 is also known as medium pressure tap 17). This branch line is connected via a further feedwater preheater 8 or medium pressure economizer to a medium pressure stage 62 of the water-steam circuit 39 associated with the medium pressure part 27 of the steam turbine 3. The second feedwater preheater 8 is to this end connected on the outlet side to a medium pressure drum 63 of the medium pressure stage 62. The medium pressure drum 63 is connected to a heating surface arranged in the waste heat steam generator 4 and configured as a medium pressure evaporator 64, to form a water-steam cycle. To carry away medium pressure live steam, the medium pressure drum 63 is connected to the intermediate superheater 55 and thus to the steam inlet 56 of the medium pressure part 27 of the steam turbine 3.

The condensate line 6 leads into a low pressure stage 65 of the water-steam circuit 39 associated with the low pressure part 28 of the steam turbine 3. The low pressure stage 65 comprises a low pressure drum 66, which is connected with a heating surface arranged in the waste heat steam generator 4 and configured as a low pressure evaporator 67 to form a water-steam cycle. To carry away low pressure live steam, the low pressure drum 66 is connected via a steam line, into which a low pressure superheater 68 is connected, to the overflow line 58. The water-steam circuit 39 of the combined-cycle turbine plant of FIG. 1 thus comprises three pressure stages. Alternatively, however, fewer, in particular two, pressure stages may also be provided.

According to the prior art, to increase efficiency the preheating of a gaseous fuel for the gas turbine 2 may proceed by means of waste gas heat. To this end, a partial flow, which transfers its heat to the fuel gas via a fuel preheating unit 10 (i.e. a heat exchanger) is branched off from the outlet of the medium pressure feedwater preheater 8. This then heavily cooled (for example around 70° C.) medium pressure feedwater partial mass flow is admixed with the condensate to be heated in the waste heat steam generator 4 and throttled 69 in the process from around 60 bar to the pressure level prevailing therein of around 25 bar.

To prevent the temperature from falling below the waste gas dew point at the "cold end" of the waste heat steam generator 4, according to the prior art hot water is recirculated from the outlet 15 of the condensate preheater 5 to the inlet 29 of the condensate preheater 5 or to the condensate line 6 by means of separate electrically operated recirculation pumps 30.

Figure 2:
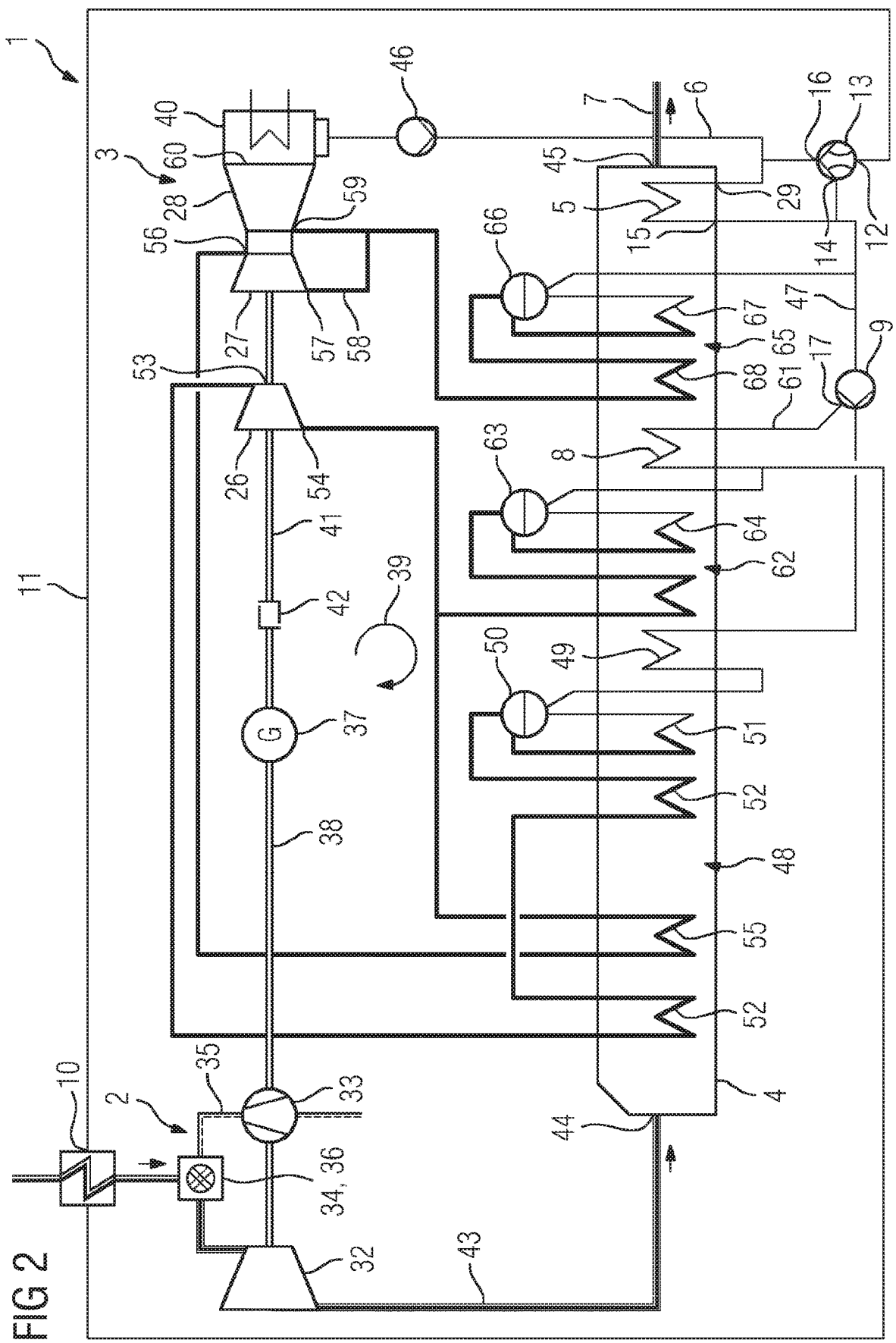
FIG. 2 shows a combined-cycle turbine plant with condensate recirculation according to the invention for gas operation.
Figure 3:
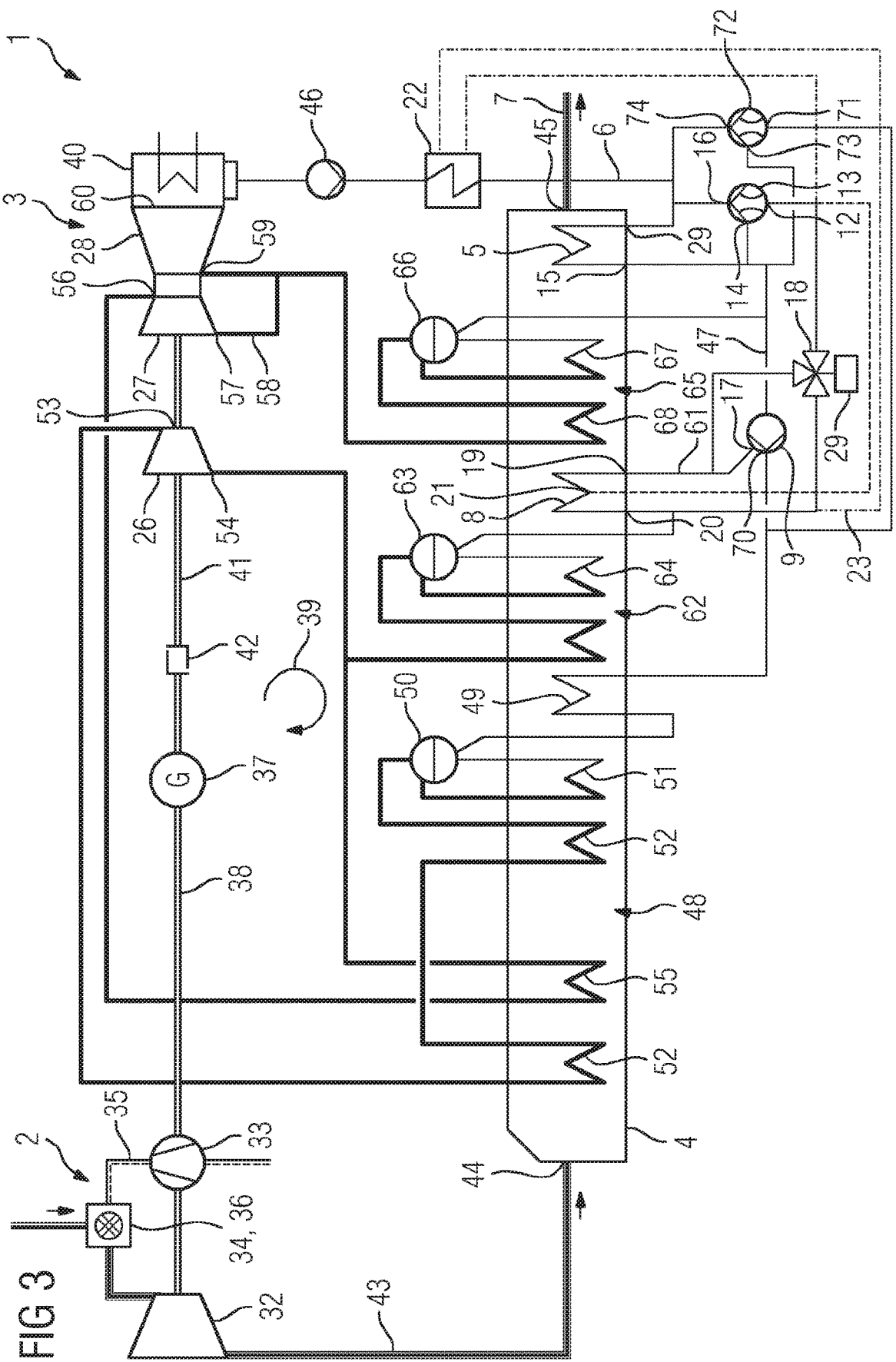
FIG. 3 shows a combined-cycle turbine plant with condensate recirculation according to the invention in particular for oil operation with alternatives for condensate recirculation and FIG. 4 shows a combined-cycle turbine plant with condensate recirculation according to the invention with a partial mass flow regulator valve.
Figure 4:
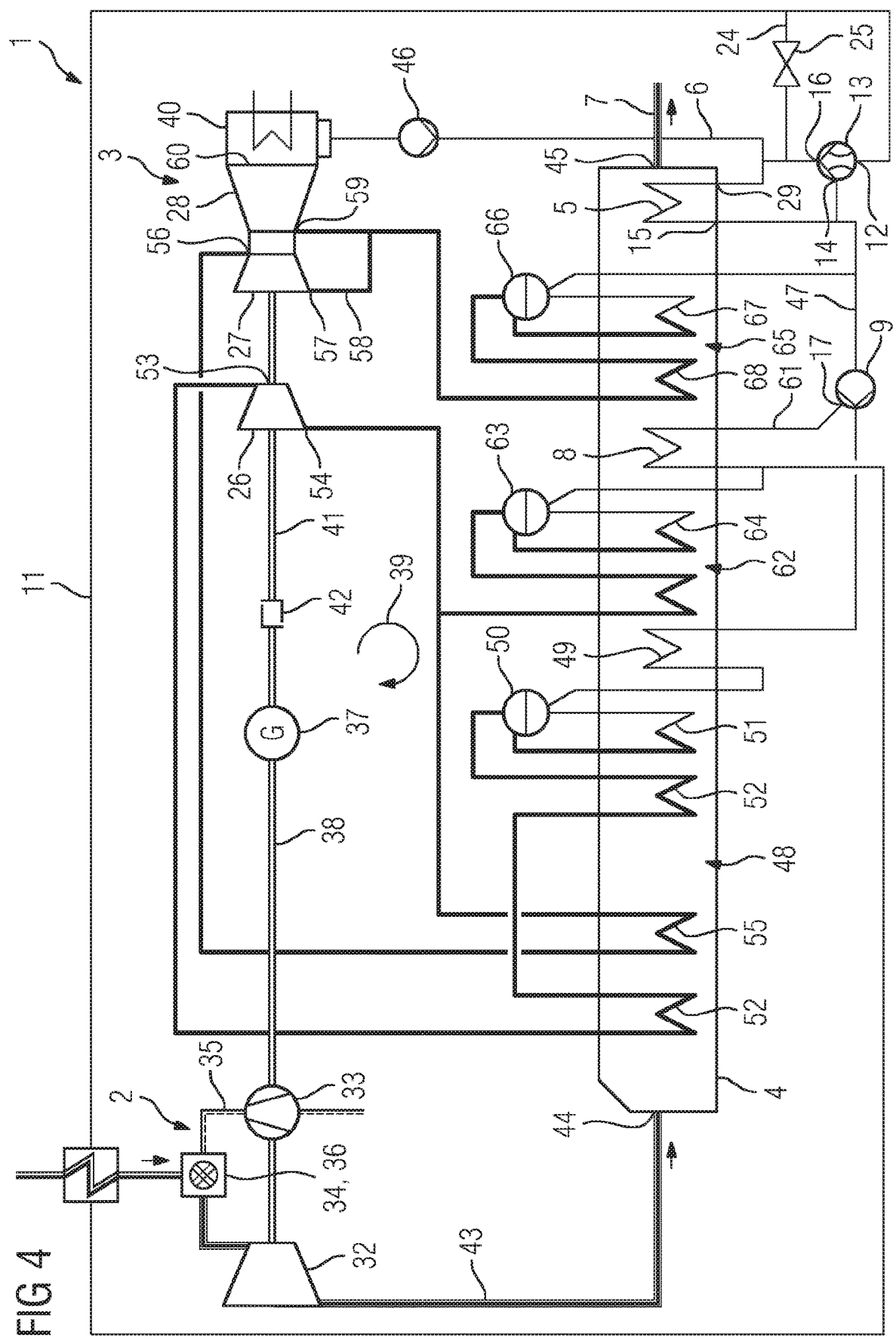

FIGS. 2 to 4 show a combined-cycle turbine plant 1 according to the invention. FIG. 2 in particular shows the components of the combined-cycle turbine plant 1 which are relevant to condensate recirculation in gas operation. The pressure energy of the feedwater coming from the fuel preheating unit 10 is now no longer throttled away 69 as in the prior art. The line 11 for cooled feedwater coming from the fuel preheating unit 10 now leads into a pump medium inlet 12 of a jet pump 13, the suction medium inlet 14 of which is connected with an outlet 15 of the condensate preheater 5 and the outlet 16 of which is connected with the condensate line 6.

FIG. 3 shows additions to the circuit of FIG. 2, in particular for instances in which, in addition to the gaseous main fuel, a liquid back-up fuel is also used and the fuel preheating unit 10 as heat sink is dispensed with. If no measures are taken to reduce the pump fluid mass flow temperature, undesired evaporation phenomena may arise in the jet pump 13. One possible measure involves connecting an outlet 17 (i.e. the medium pressure tap) of the feedwater pump 9 into the pump medium inlet 12 of the jet pump 13, for example via a control valve 18 with control device 31 for changing over between or mixing feedwater from the feedwater preheater 8 and water from the feedwater pump 9. Alternatively, a feedwater extraction point 21 may be provided between inlet 19 and outlet 20 of the feedwater preheater 8, which feedwater extraction point may be connected into the pump medium inlet 12 of the jet pump 13 (dashed line). Finally, a heat exchanger 22 may also be connected on the primary side into a line 23 to the pump medium inlet 12 of the jet pump 13 and on the secondary side into the condensate line 6 (dash-dotted line).

FIG. 3 also shows the possibility of parallel operation of two jet pumps for condensate preheating. Specifically, in this case a further outlet 70 of the feedwater pump 9 with a pressure level raised relative to the outlet 17 (or, not shown in FIG. 3, an outlet of a further feedwater pump with a pressure level raised relative to the feedwater pump 9) leads into a pump medium inlet 71 of a further jet pump 72, the suction medium inlet 73 of which is connected to an outlet 15 of the condensate preheater 5 and the outlet 74 of which is connected to the condensate line 6. This arrangement or the operation thereof is particularly advantageous for oil operation, since the feed pump 9 present (or the feed pumps present) has (have) "surplus" capacity, which may be used in this way, especially since it is precisely in the case of oil operation that condensate preheating is needed owing to the comparatively higher sulfur content in the fuel. Although FIG. 3 merely shows for the high pressure stage 48 the variant of feedwater extraction at the outlet 70 of the pump 9, all variants for operating the further jet pump 72, as shown for the medium pressure stage 62 and operation of the jet pump 13, are likewise conceivable for the high pressure stage 48, i.e. for example also extraction of the feedwater downstream of the high pressure feedwater preheater 49, mixing of feedwater extracted up- and downstream of the high pressure feedwater preheater 49 and also extraction of high pressure feedwater at a point therebetween.

FIG. 4 shows an embodiment of the combined-cycle turbine plant 1 according to the invention in which a bypass line 24 for a pump medium is guided around the jet pump 13 and a pump fluid mass flow regulator valve 25 is arranged in the bypass line 24. The quantity of the outlet mass flow of the jet pump (i.e. the recirculation mass flow) may thus be adjusted independently of the quantity of heating medium for the fuel gas preheating unit 10.

The invention claimed is:

1. A combined-cycle turbine plant, comprising:
   at least one gas turbine,
   a steam turbine,
   a waste heat steam generator, wherein the waste heat steam generator comprises a condensate preheater into which a condensate line leads and a feedwater preheater connected upstream of the condensate preheater in a direction of flow of a gas turbine waste gas, wherein upstream of which feedwater preheater a feedwater pump is connected,
   wherein the feedwater preheater is connected to a further stage of the waste heat steam generator that is disposed upstream of the feedwater preheater in the direction of flow of the gas turbine waste gas via a first circuit, and is connected to a fuel preheating unit for the at least one gas turbine via a second circuit that splits off the first circuit from a point between the feedwater preheater and the further stage, and
   a third circuit for cooled feedwater that leads from the fuel preheating unit into a pump medium inlet of a jet pump that further comprises: a suction medium inlet connected to an outlet of the condensate preheater; and an outlet connected to the condensate line, wherein in the third circuit the cooled feedwater is not subjectable to throttling.

2. The combined-cycle turbine plant as claimed in claim 1, wherein an outlet of the feedwater pump is connected into the pump medium inlet of the jet pump.

3. The combined-cycle turbine plant as claimed in claim 1, further comprising:
   a bypass line for a pump medium which is guided around the jet pump, and
   a pump fluid mass flow regulator valve which is arranged in the bypass line.

4. A method for condensate recirculation in the combined-cycle turbine plant, comprising:
   in gas operation of the combined-cycle turbine plant of claim 1, heating fuel in the fuel preheating unit using feedwater heated in the feedwater preheater of the waste heat steam generator, wherein the feedwater cools in the fuel preheating unit to become the cooled feedwater,
   returning the cooled feedwater via the third circuit, and
   using the cooled feedwater as pump fluid mass flow in the jet pump to draw in condensate from the outlet of the condensate preheater,
   wherein a mixed flow resulting from feedwater and condensate is admixed with a condensate flow before entry into the condensate preheater arranged in the waste heat steam generator.

5. The method as claimed in claim 4,
   wherein in liquid fuel operation of the combined-cycle turbine plant, feedwater before entry into the feedwater preheater is used as the pump fluid mass flow in the jet pump.

6. The method as claimed in claim 5,
   wherein a temperature of the feedwater used as the pump fluid mass flow for the jet pump is controlled by changing over between feedwater before entry into the feedwater preheater and feed water from the feedwater preheater or by mixing these suitably.

7. The method as claimed in claim 4,
   wherein the pump fluid mass flow is selectively guided in a controlled manner wholly or in part past the jet pump via a bypass line.

* * * * *